(12) United States Patent
Master

(10) Patent No.: US 11,582,225 B2
(45) Date of Patent: Feb. 14, 2023

(54) SYSTEM AND METHOD FOR DETECTING THE USER USING A SINGLE ONE-TIME PASSWORD

(71) Applicant: iCrypto, Inc., Beaverton, OR (US)

(72) Inventor: Adarbad Master, Oldsmar, FL (US)

(73) Assignee: iCrypto, Inc., Beaverton, OR (US)

(*) Notice: Subject to any disclaimer, the term of this patent is extended or adjusted under 35 U.S.C. 154(b) by 165 days.

(21) Appl. No.: 16/754,627

(22) PCT Filed: Oct. 14, 2018

(86) PCT No.: PCT/US2018/055790
§ 371 (c)(1),
(2) Date: Apr. 8, 2020

(87) PCT Pub. No.: WO2019/075447
PCT Pub. Date: Apr. 18, 2019

(65) Prior Publication Data
US 2020/0314091 A1    Oct. 1, 2020

Related U.S. Application Data

(60) Provisional application No. 62/572,443, filed on Oct. 14, 2017.

(51) Int. Cl.
*H04L 29/06* (2006.01)
*H04L 9/40* (2022.01)
(Continued)

(52) U.S. Cl.
CPC .......... *H04L 63/0838* (2013.01); *G06F 21/45* (2013.01); *H04W 12/068* (2021.01); *H04L 2463/082* (2013.01)

(58) Field of Classification Search
CPC ......... H04L 63/0838; H04L 2463/082; H04W 12/068; G06F 21/45
See application file for complete search history.

(56) References Cited

U.S. PATENT DOCUMENTS 8,412,928 B1 * 4/2013 Bowness ............. H04L 63/0838
                                                          713/155
10,491,391 B1 * 11/2019 Da Silva ............... H04L 9/3231
(Continued)

FOREIGN PATENT DOCUMENTS

WO    2017118763 A1    7/2017

OTHER PUBLICATIONS

International Search Authority (ISA), "International Search Report," International Application No. PCT/US2018/55790, dated Jan. 7, 2019, 2 pages, publisher Commissioner for Patents—PCT, Alexandria, Virginia, United States of America.
(Continued)

*Primary Examiner* — Tri M Tran
(74) *Attorney, Agent, or Firm* — Fogarty LLP

(57) ABSTRACT

An improved One Time Password (iOTP) is used in a two-factor authentication mechanism to decode a username, and the inherent security of the iOTP eliminates the need for a password. When the user is identified by the iOTP, a second challenge is sent. The second challenge may be confirmed by user biometrics or via a PIN code if the user's device does not support biometrics. Benefits of the subject invention include: (1) no username, which eliminates exposure to multiple domain attacks (i.e., attacks on other sites with the same username) that attempt to extract passwords from less secure sites (e.g., where a user used the same username and password across multiple sites); and (2) password-less access—the iOTP replaces both the username and password function, thereby eliminating the need for the user to manage multiple usernames and passwords.

11 Claims, 3 Drawing Sheets

(51) Int. Cl.
 *G06F 21/45* (2013.01)
 *H04W 12/06* (2021.01)

(56) References Cited

U.S. PATENT DOCUMENTS

| | | |
|---|---|---|
| 2013/0283362 A1 | 10/2013 | Kress et al. |
| 2014/0304789 A1* | 10/2014 | Kaplan ................. G06F 21/31 |
| | | 726/7 |
| 2015/0113278 A1* | 4/2015 | Cocchi ................ H04L 9/3247 |
| | | 713/171 |
| 2015/0172280 A1* | 6/2015 | Song ...................... G06F 21/31 |
| | | 726/6 |
| 2016/0105426 A1* | 4/2016 | Noh .................... H04L 63/0838 |
| | | 726/6 |
| 2016/0162867 A1 | 6/2016 | Weiss |
| 2018/0255053 A1* | 9/2018 | Bhabbur ............... H04L 9/3228 |

OTHER PUBLICATIONS

International Search Authority (ISA), "Written Opinion of the International Searching Authority," International Application No. PCT/US2018/55790, dated Jan. 7, 2019, 5 pages, publisher Commissioner for Patents—PCT, Alexandria, Virginia, United States of America.

\* cited by examiner

SYSTEM AND METHOD FOR DETECTING THE USER USING A SINGLE ONE-TIME PASSWORD

CROSS-REFERENCE TO RELATED APPLICATIONS

This application claims the benefit of the filing date of U.S. Provisional Patent Application No. 62/572,443, which was filed Oct. 14, 2017, the disclosure of which is hereby incorporated by reference herein in its entirety.

BACKGROUND

One-time passwords are well known and are used to verify a login username and password as part of access control to various systems. The access-control process is typically implemented with these steps:

1. A user accesses a system and is challenged to enter a username and password.
2. The user retrieves the username and password, such as from their memory or another storage mechanism (e.g., sheet of paper, another database, etc.).
3. The user enters the username and password in response to the challenge.
4. The system accepts the response and then generates a one-time password (OTP) that is sent to the user via a secondary communications channel, which is typically a text/SMS message.
5. The user receives the OTP over the secondary channel.
6. The user provides the OTP in response to the system OTP challenge.
7. The system confirms a match on the OTP and grants access to the system.

This process is burdened, however, with the requirement that the user who is attempting to login must remember and manage the usernames and passwords. Since many systems require such username and password combinations, the user will be forced to either use the same combination across all systems or manage different combinations for each system. The former scenario creates a huge security risk since a breach on any one system will reveal the access credentials for any other system. The latter scenario creates a logistical problem as the number of systems grows since this can result in the user committing the username and password combinations either to paper or some other storage mechanism, which is also open to attack. With so many systems requiring access credentials, the exposure risk and the user-management required for the username and password combinations has become an untenable situation in many cases.

SUMMARY OF THE INVENTION

An improved One Time Password (iOTP) is used in a two-factor authentication mechanism to decode a username, and the inherent security of the iOTP eliminates the need for a password. When the user is identified by the iOTP, a second challenge is sent. The second challenge may be confirmed by user biometrics or via a PIN code if the user's device does not support biometrics. Benefits of the subject invention include: (1) no username, which eliminates exposure to multiple domain attacks (i.e., attacks on other sites with the same username) that attempt to extract passwords from less secure sites (e.g., where a user used the same username and password across multiple sites); and (2) password-less access—the iOTP replaces both the username and password function, thereby eliminating the need for the user to manage multiple usernames and passwords.

BRIEF DESCRIPTION OF THE DRAWINGS

Figure 1:
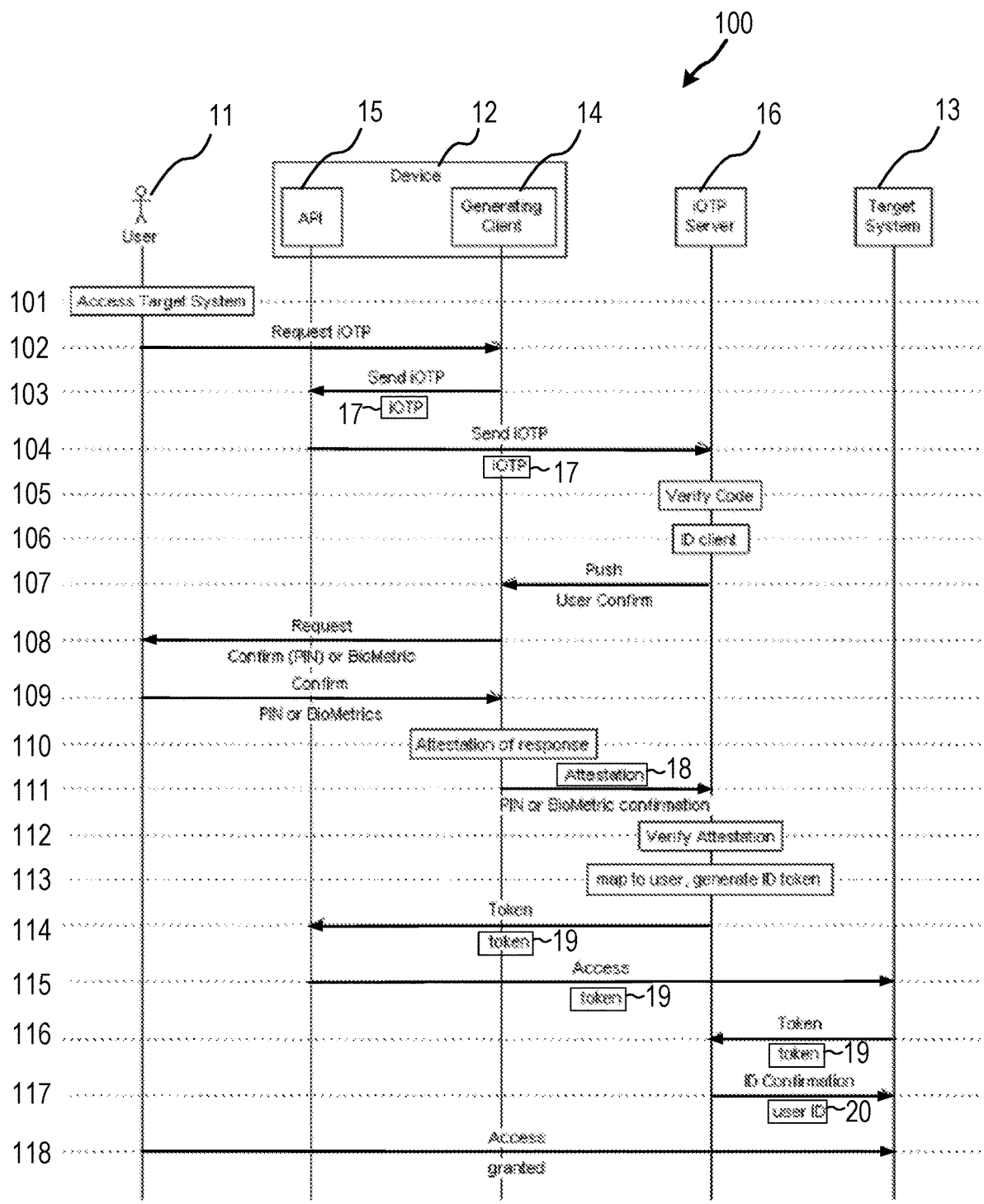

Having thus described the invention in general terms, reference will now be made to the accompanying drawings, wherein:

FIG. 1 illustrates an improved One Time Password access flow according to an example embodiment.

Figure 2:
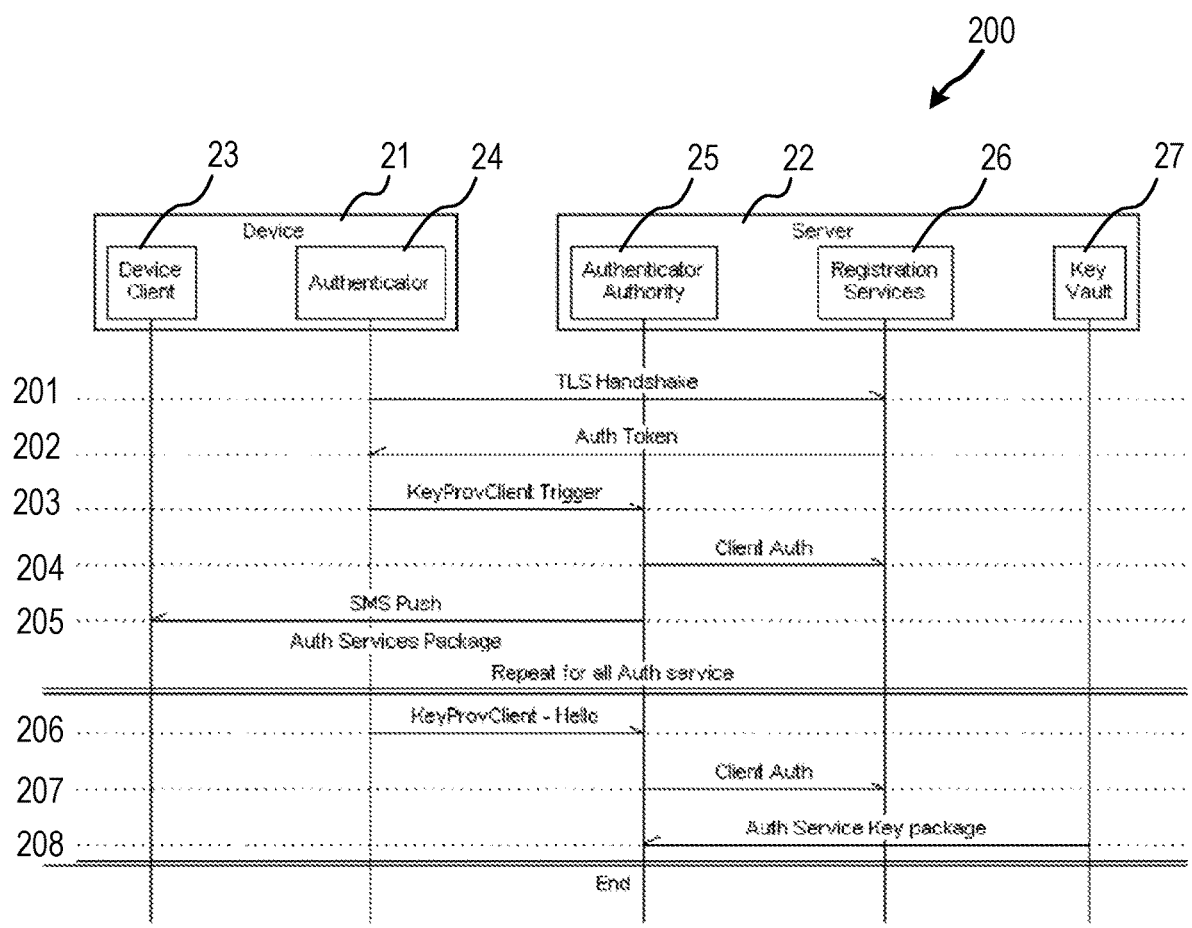

FIG. 2 illustrates an improved One Time Password access flow according to another example embodiment.

Figure 3:
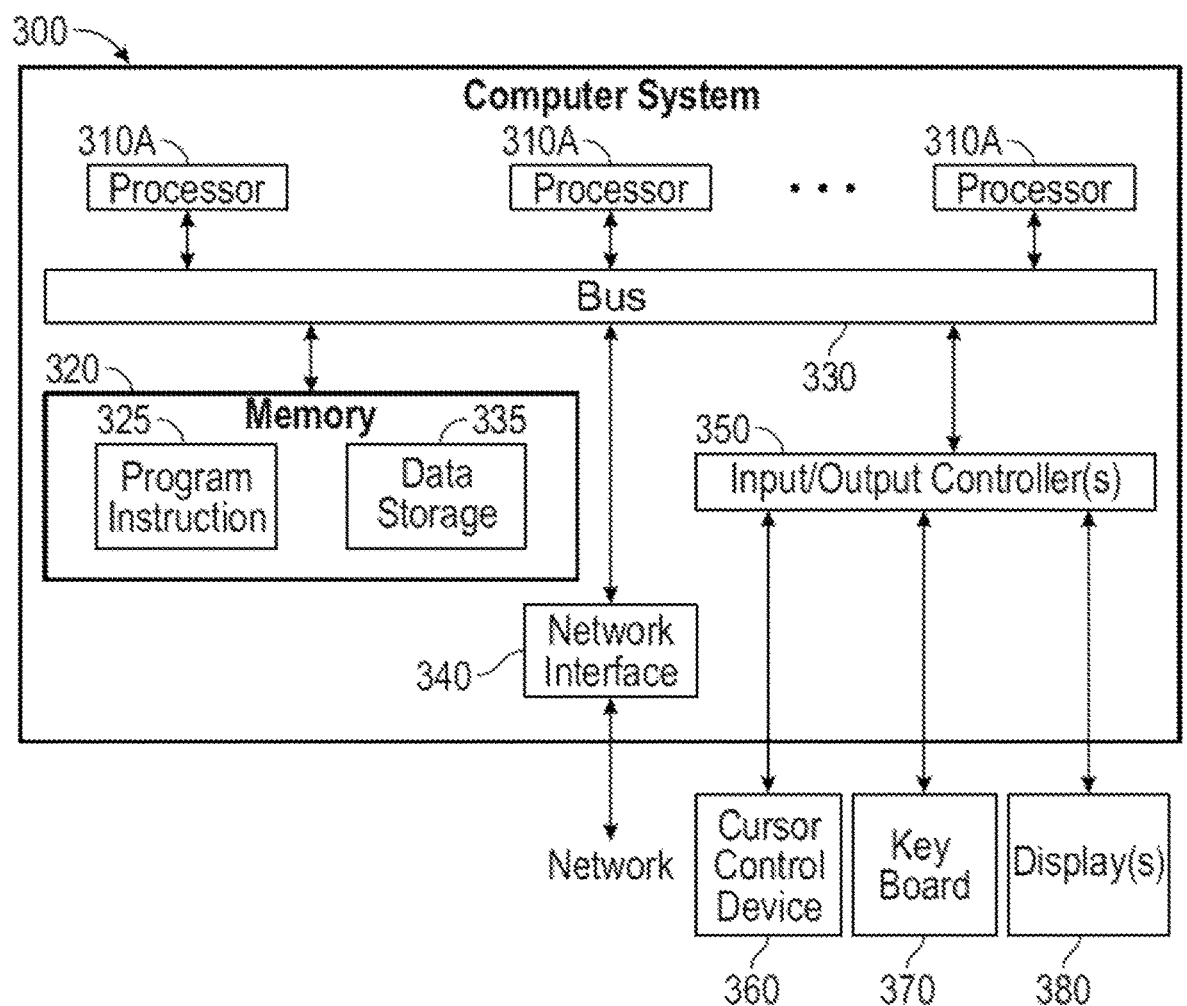

FIG. 3 is an example schematic of a user device or a server in accordance with some embodiments.

DETAILED DESCRIPTION

The invention will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Current controlled-access systems are prone to attack should the username and password combination and the target mobile be compromised. Users assumed that these systems were very secure since access would only be granted to a person who both knew the username and password combination and had the target mobile in their possession. This assumption has proven to be false. Username and password combinations can be discovered through insider collusion or successful attacks, which usually occurs because of poor management of the username and password by the user. Additionally, a process called SIM swap can be used to create a second mobile that can receive an OTP challenge that is directed to a target mobile.

Existing systems that use OTP are fraught with many problems and have numerous exposures. OTP codes are usually valid for a defined period. If the OTP code is phished (i.e., captured when transmitted), it can then be used by an attacker. Systems that use OTP typically allow multiple access attempts using the same OTP within the validity period. Should the shared secret be compromised by an attack, the attacker can generate their own valid OTP and can access multiple user accounts.

These problems and other issues are addressed by the systems and methods disclosed herein. An improved One-Time Passcode (iOTP) may be generated on the user's device and transmitted when needed. The controlled-access system accepts only one use, which eliminates exposure to phishing attacks. Multiple attempts to login will lockout access. The iOTP uses two secrets, and each is stored in a different place. This makes it extremely difficult to obtain both parts, which would require breaching both databases. By regularly syncing the time on both the user's device (i.e., using a generating client) and an iOTP server, the time window of validity can be tightly constrained, which eliminates the need for multiple validity windows that would extend the exposure time for attacks.

The improved controlled-access system allows a user to enter a single numeric (or alphanumeric) iOTP that discovers and verifies a user's identity within the same atomic transaction. Using a single iOTP from an Application Programming Interface (API), the iOTP server uniquely identifies a generating client that generated the iOTP and verifies that the generating client could only have belonged to a specific user. The generating client may be identified using a device identifier and/or software token, for example. A key advantage of this mechanism is that the generating client need not be connected to the iOTP server or the API, instead it can be completely offline. Recognition of the iOTP depends only on secrets and identity data that is pre-provisioned into the generating client.

A rotating iOTP may be based on a modified Time-based One-Time Password (TOTP) algorithm using certified off-the-shelf encryption technologies. TOTP is based on generation of unique OTPs using the algorithm described in RFC 6238—"TOTP: Time-Based One-Time Password Algorithm," the disclosure of which is hereby incorporated by reference herein. TOTP is based on keyed-Hash Message Authentication Code (HMAC)-based One-Time Password (HOTP) with a timestamp replacing the incrementing counter. The current timestamp is turned into an integer time-counter (TC) by defining the start of an epoch (T0) and counting in units of a time step (TS). For example:

$$TC=(\text{unixtime}(\text{now})-\text{unixtime}(T0))/TS \quad (1)$$

$$TOTP=HOTP(SecretKey,TC), \quad (2)$$

where the HOTP algorithm is defined below.

$$TOTP\text{-Value}=TOTP \bmod 10^d, \quad (3)$$

where d is the desired number of digits of the one-time password.

Let:
K be a secret key
C be a counter
Then:

$$HMAC(K,C)=SHA1(K \oplus 0x5c5c \ldots \| SHA1(K \oplus 0x3636 \ldots \| C)) \quad (4)$$

is an HMAC calculated with the Secure Hash Algorithm 1 (SHA-1) cryptographic hash algorithm.

Truncate is a function that selects four bytes from the result of the HMAC in a defined manner
Where:
$\|$ denotes concatenation,
$\oplus$ denotes exclusive or (XOR),
Then we define $$HOTP(K,C)=\text{Truncate}(HMAC(K,C)) \& 0x7FFFFFFF \quad (5)$$

Alternatively, HOTP(K,C) may be defined as set forth in RFC 4226—"HOTP: An HMAC-Based One-Time Password Algorithm," the disclosure of which is hereby incorporated by reference herein.

The mask is used to disregard the most significant bit to provide better interoperability between processors.

Like TOTP, an iOTP has a variable TS, usually in increments of 30 seconds, and is commonly pegged at 30 secs for most applications. Also, like TOTP, code verification is done in a sliding window fashion where, for any point in time, codes are verified for N previous and N following periods, wherein N is usually 2. This requires that the generating client and the iOTP server are in lockstep regarding the system time and in effect synchronized from a well-known universal source (e.g., usually an internet NTP server).

Since the passcode is rotating periodically, iOTP has the same security characteristics as HOTP/TOTP. The controlled-access system may further augment the security significantly with the addition of biometrics.

FIG. 1 illustrates iOTP access flow 100 according to an example embodiment. A user 11 with a device 12 desires to access target system 13. User device 12 has a generating client 14 for generating iOTP codes and an API 15 for interfacing with a remote iOTP server 16 and target system 13.

In step 101, user 11 requests to access target system 13. This request may be an input to a user interface or application running on device 12. For example, device 12 may be running an application that requires secure access, such as a banking or messaging application (not shown), and target system 13 may be a corresponding service. In step 102, a request for an iOTP is sent to generating client 14, which generates an iOTP 17 using, for example, a modified Time-based One-Time Password (TOTP) algorithm as disclosed herein. After generating an iOTP, generating client 14 sends the iOTP 17 to API 15 in step 103. Then in step 104, API 15 sends iOTP 17 to iOTP server 16.

In step 105, iOTP server 16 verifies the iOTP code 17 and then, in step 106, iOTP server 16 converts iOTP 17 into a user identity. In step 107, iOTP server 16 sends a message to generating client 14 requesting user 11 to confirm his or her identity. In step 108, generating client 14 then requests that user 11 provide confirmation, such as by entering a PIN (e.g., a numeric or alphanumeric code) or biometric identifier (e.g., a fingerprint, iris scan, face scan, speech sample, etc.). User 11 enters confirmation information on device 12, such as by using a keypad, camera, fingerprint reader, etc. The confirmation information is sent to generating client 14 in step 109.

In step 110, generating client 14 creates an attestation of the user's response as evidence that user 11 is who they claim to be. In step 111, the attestation 18 is sent to iOTP server 16, which then verifies the attestation 18 in step 112. In step 113, the iOTP server 16 maps the iOTP to the user 11 and generates an ID token. In step 114, iOTP server 16 sends ID token 19 to API 15, which then uses token 19 to access target system 13 in step 115.

In step 116, target system 13 sends token 19 back to iOTP server 16, which verifies the user associated with the token 19 and then sends a user ID 20 back to target system 13 to confirm the user identity. Once target system 13 receives confirmation of the user's identity, then access is granted to user 11 in step 118.

Channel Mapping

A channel can be defined as a generating client using a certain shared key Kc for channel c. For example, two TOTP-based iOTPs may be generated from separate channels that have the same time-sequence constant $I_0$ and shared secret keys K1 and K2, respectively. The iOTPs generated on channels 1 and 2, respectively, are:

$$A=HMAC\text{-}SHA\text{-}1(K1,I_0), \text{ and}$$

$$B=HMAC\text{-}SHA\text{-}1(K2,I_0).$$

Given that A and B are different, the iOTP server can determine that A is linked to channel 1 (K1), and B to channel 2 (K2) during validation of A and B. In other words, every iOTP that is generated can be linked to its respective channel.

It is mathematically possible to show that not all iOTPs generated using key K1 will be different from all the iOTPs generated using key K2. This is because the TOTP specification requires truncating the 160-bit output of HMAC. However, the probability of duplication (i.e., iOTP collision) is very low as discussed below in the section on security analysis. To mitigate a false positive in case of iOTP collision, additional verification may be performed, such as using a mobile push that is sent to the generating client to collect a PIN or biometric data as shown in FIG. 1 at steps 107-108.

From an implementation point of view, the server side will have to calculate all iOTPs for all channels until either a match is found, or all possibilities are exhausted. However, the only channels that need to be considered are those for users who have signed for the API. That is, if an iOTP server is to match an iOTP for a specific target system (e.g., a MegaCorp Portal login), then iOTP server has to generate iOTPs only for those users who are enrolled to this service and use the API. This is a key step to dramatically limiting the required computational volume, thereby making the iOTP process practical.

iOTP Computation

The iOTP is comprised of three parts as show in Table 1:

TABLE 1

|  | Part 1 (optional) | Part 2 | Part 3 (optional) |
| --- | --- | --- | --- |
| Token Part | Bucket Number | Search Code | Confirm Code |
| Length | Variable | Variable | Variable |
| Format | Numeric | Numeric or alphanumeric | Numeric or alphanumeric |

The number of digits for each code segment is variable and depends on parameters such as user population size, desired performance, and processing cost.

Bucket Number is used to divide the user population into group ("buckets") of roughly equal size, thereby allowing the system to spread the computational load over multiple systems. If the user population size is small (e.g., >20,000), then there may be no need for a bucket number. If the population size is over 100,000, then the bucket number may be large as much as four digits in length. Alphanumeric bucket numbers are desirable when the user population is very large as they give a wider bucket range using up to 36 characters (i.e., 10 digits and 26 case-insensitive alphabet characters).

An N-digit iOTP is periodically generated by a generating client (e.g., a mobile phone, or any computational device) using a well-defined hashing algorithm. The iOTP code is then used by an API that passes the iOTP to an iOTP server. The iOTP server extracts the bucket number (if any) and computes all the possible TOTP for the given bucket of users. For example, if there are 10,000 users in a bucket, the iOTP server will quickly generate 10,000 iOTP values and then try and match one of these to the iOTP provided via the API. If there is a single match, the iOTP server then knows which of the 10,000 users generated the code.

Table 2 is an example illustrating discovery of the user ID. The iOTP sever generates a list of iOTPs (column 3) for the list of MSISDNs for the bucket (column 2). In the example of Table 2, the iOTP generated by the iOTP server in the second row matches the iOTP code provided by the API (column 1). The iOTP server can then match the matching generated iOTP code to the MSISDN in column 2 to discover that the user identity is 4257850001 in this example.

TABLE 2

| iOTP from API | MSISDN list in Bucket | Server-generated iOTP |
| --- | --- | --- |
| 325478 | 4257850000 | 097856 |
|  | 4257850001 | 325478 |
|  | . . . | . . . |
|  | 4257859999 | 675849 |

The use of iOTPs is practical in view of the general availability of high-performance computing capacity at reasonable cost, which allows the iOTP server to generate the test iOTPs for the entire bucket of users.

If there is a single shared secret between the iOTP-generating client and the iOTP server, as is the case in TOTP installations, the shared secret could not be put into a secure system such as a Hardware Security Module (HSM) or a Key Management Service because the additional burden of retrieving all secrets from the HSM (itself a cryptographic process) would make the design untenable.

iOTP, therefore, has two secrets (symmetric cryptographic keys) per generating client—a Search Secret and a Confirm Secret. Each secret is used by the generating client to generate a TOTP code of variable length, which is defined as part of the key provisioning.

Search Code is a TOTP code generated using the Search Secret. The Search Secret is made accessible without encryption at the iOTP server in a database. From a design point of view, the Search Secret may also be stored in an HSM and then loaded after decryption into memory by the iOTP server. The Confirm Secret is highly protected and should be stored only in an HSM and retrieved for usage and then discarded from memory once that use is complete. By using this two-step process, the computationally costly step of retrieving the generating client's Confirm Secret is limited to only those entries where the Search Code is matched.

Upon receiving the iOTP from an API, the iOTP server does the following:
1. Extract the Bucket Number (if it exists) and narrow the user population to only the generating clients or devices that are associated with users who belong to the bucket. For example, given a one-million user population having a single client each, using a two-digit bucket assignment would reduce the search population to approximately 10,000 clients;
2. Extract, from a local database, the Search Secret for all generating clients belonging to users in the bucket population;
3. Divide the generating clients population into N Compute Groups;
4. Assign a Compute Group to a Compute Server;
5. Each Compute Server (horizontally scale the computing processor) will calculate the Search Code using the current time and the Search Secret using the TOTP algorithm;
6. Gather all generating clients that have the same Search Code as that contained in the input iOTP, the Search Code Client Match (SCCM);
7. Extract the Confirm Secret from the HSM for the SCCM and compute the Confirm Code for each generating client in the SCCM;
8. If the computed Confirm Code matches the Confirm Code contained in the input iOTP passcode, then the iOTP server has not only verified the passcode but also ascertained that it could have been only generated in the current time period by this particular generating client (see Table 1 above, for example); and 9. If there is no match for the Search Code or the Confirm Code, then the system changes the time period forward or backward and repeats the computations until the sliding window is exhausted or the passcode is confirmed.

There must be only one confirmed passcode. If there are multiple confirmed iOTP passcodes (which would be extremely rare), then the iOTP server returns a resubmit code to the API. This results in the API requesting the user to enter the iOTP passcode from a subsequent time period. The above computation is performed again, but only for those generating clients that were detected as colliding.

There is still a possibility that a Search Code and Confirm Code could match for multiple different generating clients in multiple different time periods for the sliding windows. Since the computation stops when a generating client is uniquely identified in a particular time period, this type of collision will not be detected. To correct for this rare occurrence, the subject invention may request that the generating client be further confirmed by asking it to participate in a multi-factor transaction. The most common mechanism is to send a mobile push to the device asking the user to enter PIN or biometrics (such as a fingerprint) into the generating client. Once the authenticators are gathered, the generating client signs their usage with Private Keys that the generating client has generated explicitly for this purpose. The Public Keys are available to the iOTP server, which then verifies the signatures. In this way the generating client, and hence the user, is explicitly identified.

If the generating client is not a smartphone, then the above algorithm can be modified to allow for a user PIN verification. This is done by the user entering the iOTP passcode into the API followed by a unique PIN that they have been assigned. The PIN digits are only considered for verification after the iOTP has been used to identify the generating client.

iOTP requires a mechanism for the provisioning of symmetric keys providing equivalent functionality to mechanisms, such as the Internet X.509 Public Key Infrastructure Certificate Management Protocol (CMP) specified in RFC4210, and Certificate Management over CMS (CMC) as specified in RFC5272, in a Public Key Infrastructure.

In hardware-token-based services, such as Universal 2nd Factor (U2F), cryptographic modules have been provisioned with keys during device manufacturing. The keys have been imported to the cryptographic server using, for example, a CD-ROM disc shipped with the devices. However, in case of iOTP, there is a clear protocol between cryptographic module (corresponding to generating client) and the iOTP server.

In one embodiment, iOTP uses the two-pass variant of the Dynamic Symmetric Key Provisioning Protocol (DSKPP) proposed by the IETF Keyprov Working Group as specified in RFC6063.

DSKPP provides an open and interoperable mechanism for initializing and configuring symmetric keys to cryptographic modules that are accessible over the Internet. In addition to defining the key exchange protocol, DSKPP contains specific enhancements, such as user authentication and support for the Portable Symmetric Key Container (PSKC) format as specified in RFC6030 for transmission of keying material.

iOTP has further enhanced the DSKPP protocol by creating a two-channel variant wherein the DSKPP Provisioning Trigger is done via HTTP-SSL and the Authentication Services package information provided via mobile push notification. Breaking the data transfer into two channels further protects the protocol against man-in-the-middle attacks. Additionally, keying of the protocol to an authenticated device session and one-time public-private key encryption of the key package contents reduces the chance of compromise.

FIG. 2 illustrates iOTP access flow 200 according to another example embodiment. Device 21 communicates with server 22. Device 21 comprises a device client 23 and an authenticator 24. Server 22 comprises an authenticator authority 25, registration services 26, and key vault 27. In step 201, authenticator 24 initiates a Transport Layer Security (TLS) handshake with registration services 26, which responds in step 202 with an authentication token. In step 203, authenticator 24 sends a key provisioning client trigger message to authenticator authority 25, which then sends a client authorization message in step 204. In step 205, authenticator authority 25 sends an SMS push message with an authentication services package to device client 23. Steps 201 to 205 are then repeated for each authentication service.

In step 206, authenticator 24 sends a key provisioning client Hello message to authenticator authority 25, which then sends a client authorization message in step 207. In step 208, key vault 27 sends an authentication service key package to authenticator authority 25.

iOTP Security Analysis

Security analysis of HMAC, SHA1, Password-Based Key Derivation Function 2 (PBDKF2)(see RFC 2898 and RFC8018), TOTP, HOTP and DSKPP protocols are extensively covered in their respective RFCs and in a plethora of papers. Several issues and shortcomings, however, bear discussion in the iOTP context.

Secure Key Transfer

A point of vulnerability in any shared key system is that of key transfer over the wire/air. iOTP has taken great care to make sure that generated keys on the server are transmitted to client in a secure manner. This is accomplished with the following enhancements:

Key confirmation is done via Message Authentication Code (MAC) on exchanged data;

Replay protection through inclusion of client-provided data in MAC;

Server authentication through MAC in ServerFinished message when replacing existing key;

Protection against Man In The Middle {MITM) through use of shared keys, client certificates, or server public key usage;

User authentication using authentication code; and

Device authentication based on shared secret key.

SHA-1 Vulnerability

A research team of Xiaoyun Wang, Yiqun Lisa Yin, and Hongbo Yu (from Shandong University in China) have circulated a draft paper describing an attack on SHA-1 that breaks SHA-1. Cryptographers use the term "broken" whenever they can demonstrate the vulnerability is more successful than a simple brute force attack. In this case, the vulnerability is related to collisions and the exploit would still require significant computing power.

HMAC (Hashed Message Authentication Code) uses SHA-1 internally. The difference is that a MAC uses a secret key. The use of the secret makes collision attacks of the type identified by Wang, et. al. irrelevant. Security of the HMAC OTP algorithm is not affected because HMAC was designed so that collisions in the hash function would not produce forgeries in HMAC.

No flaws have been identified in HMAC-OTP. As described above, the use of SHA-1 introduces no known vulnerabilities into HMAC-OTP Password Collisions Password collision in iOTP is said to occur if there are two or more possible channels that generate the same password for a given time period, that is:

$$HOTP(K_1,C)=HOTP(K_2,C)=\ldots=HOTP(K_m,C)$$

The above issue reduces to a description of the birthday attack problem. A birthday attack is a type of cryptographic attack that exploits the mathematics behind the birthday problem in probability theory. The attack depends on the higher likelihood of collisions found between random attack attempts and a fixed degree of permutations (pigeonholes), as described in the birthday problem/paradox.

The basic mathematical statement of the birthday attack is this:

Given a function f, the goal of the attack is to find two different inputs $X_1$, $X_2$ such that $f(X_1)=f(X_2)$. Such a pair $X_1$, $X_2$ is called a collision. The method used to find a collision is simply to evaluate the function f for different input values that may be chosen randomly or pseudo-randomly until the same result is found more than once. Because of the birthday problem, this method can be rather efficient. Specifically, if a function f(X) yields any of H different outputs with equal probability and H is sufficiently large, then we expect to obtain a pair of different arguments $X_1$ and $X_2$, with $f(X_1)=f(X_2)$, after evaluating the function for about $1.25\times\sqrt{H}$ different arguments on average.

Computing from above, a password of 8 digits (64 bits) will have a 0.1% collision probability after $1.9\times10^8$ hash computations. To raise the probability to 50% an attacker would have to do $5.1\times10^9$ computations.

As can be ascertained from above discussion, the probability that an 8-digit OTP could map to the wrong channel is extremely low.

Some embodiments of systems and methods for detecting the user using a single one-time password, as described herein, may be implemented or executed, at least in part, by one or more computer systems. One such computer system is illustrated in FIG. 3. In various embodiments, computer system 300 may be a server, a mainframe computer system, a network appliance, a workstation, a network computer, a desktop computer, a laptop, a tablet, a handheld device, a mobile device, a smartphone, or the like. For example, in some cases, device 12, iOTP server 16, target system 13, device 21, and server 22 as shown in FIGS. 1 and 2 may include at least one computer such as computer system 300. As explained above, in different embodiments these various computer systems may be configured to communicate with each other in any suitable way, such as, for example, via various networks.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol, including wireless local area networks, WiFi connections, mobile and cellular data networks, and SMS networks.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C #, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations including virtual configurations.

It should be understood that the various operations described herein, particularly in connection with FIGS. 1 and 2, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
    generating a one-time password using a client application associated with one of a plurality of mobile devices;
    receiving the one-time password from the client application;
    detecting a code in the received one-time password, wherein the code declares a group comprising a subset of a plurality of possible client applications associated with the plurality of mobile devices;
    computing a plurality of possible one-time passwords that are valid within a time window only for the subset of possible client applications, wherein each of the possible one-time passwords corresponds to a different client application, and wherein the client application is a member of the group, wherein the size of the code based on the size of the group;
    comparing the received one-time password with each of the possible one-time passwords to identify one of the possible one-time passwords that matches the received one-time password; and
    determining an identity of the client application that sent the one-time password by identifying one of the client applications that corresponds to the one matched possible one-time password.

2. The method of claim 1, further comprising generating the received one-time password using a Time-based One-Time Password (TOTP) algorithm.

3. The method of claim 1, wherein generating the one-time password comprises generating the one-time password using keys including at least two parts comprising a) a first part stored in a database that is processed to narrow down a population of potential matches and b) a second part that is stored in a higher security database.

4. The method of claim 2, wherein computing the possible OTPs that are valid within a time window (TOTPs) further comprises:
    identifying a plurality of potential generating clients that could have generated the received OTP; and
    dividing the potential generating clients into a plurality of the groups.

5. The method of claim 4, further comprising:
    computing the possible one-time passwords that are valid within a time window only for the group comprising the client application.

6. A server, comprising:
    at least one processor and a memory coupled to the at least one processor, the memory storing program instructions executable by the at least one processor to cause the server to:
    receive a one-time password generated by a client application associated with one of a plurality of mobile devices;
    detecting a code in the received one-time password, wherein the code declares a group comprising a subset of a plurality of possible client applications associated with the plurality of mobile devices, wherein the size of the code based on the size of the group;

compute the possible one-time passwords that are valid within a time window only for the subset of possible client applications, wherein each of the possible one-time passwords corresponds to a different client application, and wherein the client application is a member of the group;

compare the received one-time password with each of the possible one-time passwords to identify one of the possible one-time passwords that matches the received one-time password; and determine an identity of the client application that sent the one-time password by identifying one of the client applications that corresponds to the one matched possible one-time password.

7. The server of claim 6, wherein the program instructions further cause the computer system to generate the received one-time password using a Time-based One-Time Password (TOTP) algorithm.

8. The server of claim 6, wherein keys used to generate the one-time password include at least two parts comprising a) a first part stored in a database that is configured to be processed to narrow down a population of potential matches and b) a second part that is stored in a higher security database.

9. The server of claim 7, wherein computing the possible OTPs that are valid within a time window (TOTPs) further comprises:

identify a plurality of potential generating clients that could have generated the received OTP; and divide the potential generating clients into a plurality of the groups.

10. The server of claim 6, wherein the mobile device comprises a computational device, a Smart Phone, a laptop, a computer, an internet of things device, or a device capable of generating a TOTP.

11. The server of claim 9, wherein the program instructions further cause the computer system to:

compute the possible one-time passwords that are valid within a time window only for the group comprising the client application.

* * * * *